United States Patent
Adachi et al.

(10) Patent No.: US 9,235,266 B2
(45) Date of Patent: Jan. 12, 2016

(54) ELECTRONIC APPARATUS INCLUDING VIBRATING SECTION WHICH VIBRATES DEPENDING ON REPRODUCTION POSITION

(71) Applicant: PANASONIC CORPORATION, Osaka (JP)

(72) Inventors: Yusuke Adachi, Osaka (JP); Hiroyuki Uenaka, Hyogo (JP); Ryo Okumura, Osaka (JP); Naoto Yumiki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 63 days.

(21) Appl. No.: 14/159,845

(22) Filed: Jan. 21, 2014

(65) Prior Publication Data

US 2014/0132547 A1    May 15, 2014

Related U.S. Application Data

(63) Continuation of application No. PCT/JP2012/004685, filed on Jul. 24, 2012.

(30) Foreign Application Priority Data

Jul. 29, 2011    (JP) .................................. 2011-166292

(51) Int. Cl.
*G06F 3/043*    (2006.01)
*G06F 3/01*    (2006.01)
(Continued)

(52) U.S. Cl.
CPC ................ *G06F 3/016* (2013.01); *G06F 3/041* (2013.01); *G06F 3/04855* (2013.01); *G06F 3/04883* (2013.01); *G11B 19/025* (2013.01); *G06F 2203/014* (2013.01)

(58) Field of Classification Search
CPC ..... G06F 3/016; G06F 3/041; G06F 2203/014; G06F 3/04883; G06F 3/04855
USPC .................... 345/173–178; 178/18.01–18.09, 178/20.01–20.04
See application file for complete search history.

(56) References Cited

U.S. PATENT DOCUMENTS 8,300,504 B2 * 10/2012 Kataoka et al. ............. 369/30.03
2003/0223334 A1 * 12/2003 Hori ............................. 369/53.3

(Continued)

FOREIGN PATENT DOCUMENTS

JP    2001-042791 A    2/2001
JP    2005-010118 A    1/2005

(Continued)

OTHER PUBLICATIONS

Form PCT/ISA/237 with Partial English Translation issued in International Application No. PCT/JP2012/004685.

(Continued)

*Primary Examiner* — Vijay Shankar
(74) *Attorney, Agent, or Firm* — McDermott Will & Emery LLP

(57) ABSTRACT

An electronic device includes: a reproduction section for reproducing a content item; a touch panel for detecting a user operation for changing a reproduction position of the content item; and a vibrating section for vibrating the touch panel. The vibrating section varies the vibration of the touch panel depending on whether or not the reproduction position which has been changed through the user operation detected by the touch panel is a specified reproduction position.

14 Claims, 14 Drawing Sheets

(51) Int. Cl.
  *G06F 3/0485* (2013.01)
  *G06F 3/0488* (2013.01)
  *G11B 19/02* (2006.01)
  *G06F 3/041* (2006.01)

(56) References Cited

U.S. PATENT DOCUMENTS

2005/0231466 A1 10/2005 Tada
2008/0110970 A1 5/2008 Kataoka et al.
2009/0096755 A1 4/2009 Shinkai et al.
2010/0107082 A1 4/2010 Ban
2011/0050591 A1 3/2011 Kim et al.

FOREIGN PATENT DOCUMENTS

| JP | 2005-71157 A | 3/2005 |
|---|---|---|
| JP | 2006-171945 A | 6/2006 |
| JP | 2008-098726 A | 4/2008 |
| JP | 2008-187374 A | 8/2008 |
| JP | 2009-093450 A | 4/2009 |
| JP | 2009-141602 A | 6/2009 |
| JP | 2010-004309 A | 1/2010 |
| WO | 2006/068114 A1 | 6/2006 |
| WO | 2008/120638 A1 | 10/2008 |

OTHER PUBLICATIONS

International Search Report issued in International Application No. PCT/JP2012/004685 with Date of mailing Aug. 21, 2012, with English Translation.

Notice of Reasons for Rejection dated Sep. 9, 2014 issued in the corresponding Japanese Patent Application No. 2013-526739.

* cited by examiner

ELECTRONIC APPARATUS INCLUDING VIBRATING SECTION WHICH VIBRATES DEPENDING ON REPRODUCTION POSITION

This is a continuation of International Application No. PCT/JP2012/004685, with an international filing date of Jul. 24, 2012, which claims priority of Japanese Patent Application No. 2011-166292, filed on Jul. 29, 2011, the contents of which are hereby incorporated by reference.

BACKGROUND

1. Technical Field

The present disclosure relates to an electronic device which can be operated by a user.

2. Description of the Related Art

Electronic devices having touch panels such as smart phones and tablet PCs have been widespread. Such electronic devices are operated by the user sliding a finger on the touch panel.

Patent Document No. 1 (Japanese Laid-Open Patent Publication No. 2009-93450) discloses a device which presents to the user a change in tactile sensation by vibrating the touch panel in accordance with the user operation on the touch panel. With the device disclosed in Patent Document No. 1 (Japanese Laid-Open Patent Publication No. 2009-93450), when the user edits a movie with a frame-by-frame precision, a vibration is always generated when a frame switches to another, thereby notifying the user of the point of a frame switch.

SUMMARY

The present disclosure provides an electronic device which is vibrated so that it is easy to use when reproducing content items.

An electronic device of the present disclosure includes: a reproduction section for reproducing a content item; an operation section for detecting a user operation for changing a reproduction position of the content item; and a vibrating section for vibrating the operation section, wherein the vibrating section varies the vibration of the operation section depending on whether or not the reproduction position which has been changed through the user operation detected by the operation section is a specified reproduction position.

With the electronic device of the present disclosure, it is possible to efficiently find a specified reproduction position from within a content item being reproduced.

DETAILED DESCRIPTION

Figure 1:
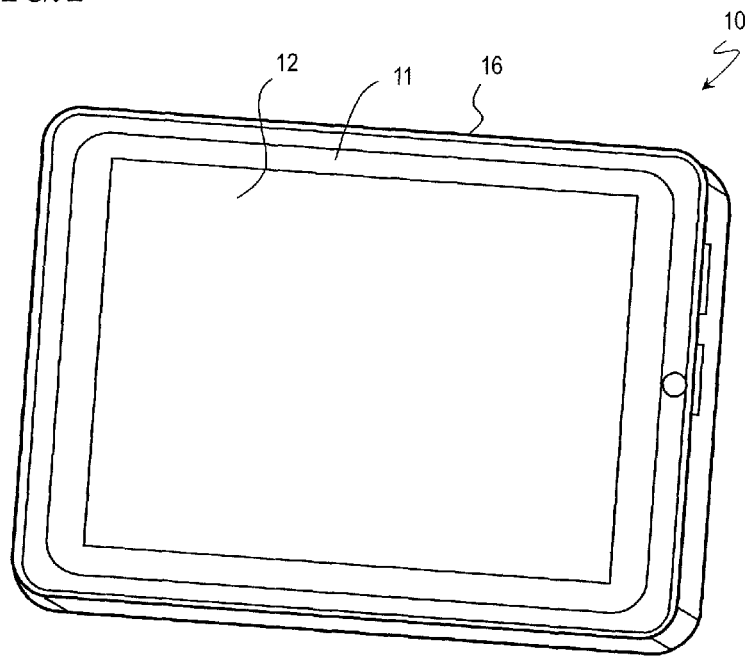
FIG. 1 is an external perspective view of an electronic device according to an embodiment.

Embodiments will now be described in detail, referring to the drawings as necessary. Note however that unnecessarily detailed descriptions may be omitted. For example, detailed descriptions on what are well known in the art or redundant descriptions on substantially the same configurations may be omitted. This is to prevent the following description from becoming unnecessarily redundant, to make it easier for a person of ordinary skill in the art to understand.

Note that the present inventors provide the accompanying drawings and the following description in order for a person of ordinary skill in the art to sufficiently understand the present disclosure, and they are not intended to limit the subject matter set forth in the claims.

(Embodiment 1)

[1. Configuration]

[1-1. Configuration of Electronic Device 10]

Figure 2:
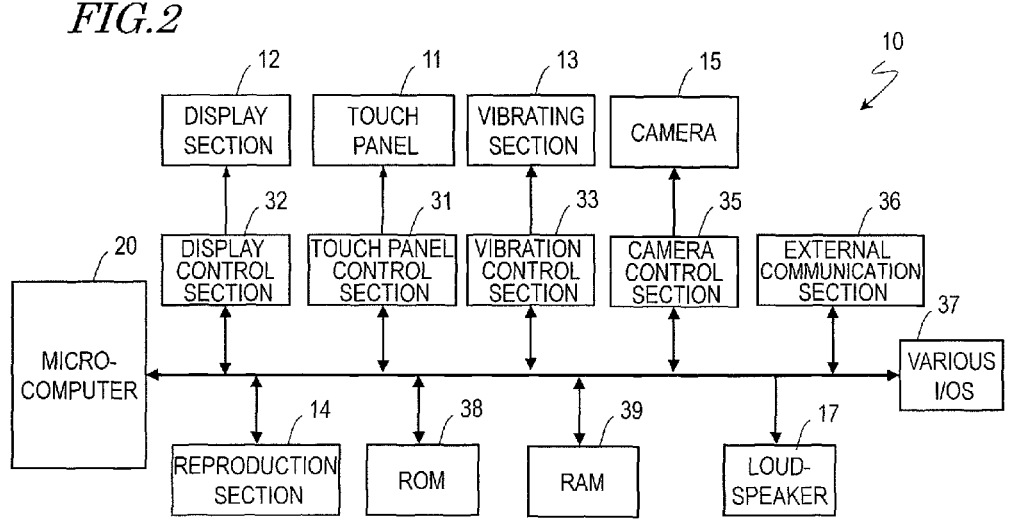
FIG. 2 is a block diagram showing a configuration of the electronic device according to an embodiment.
Figure 3:
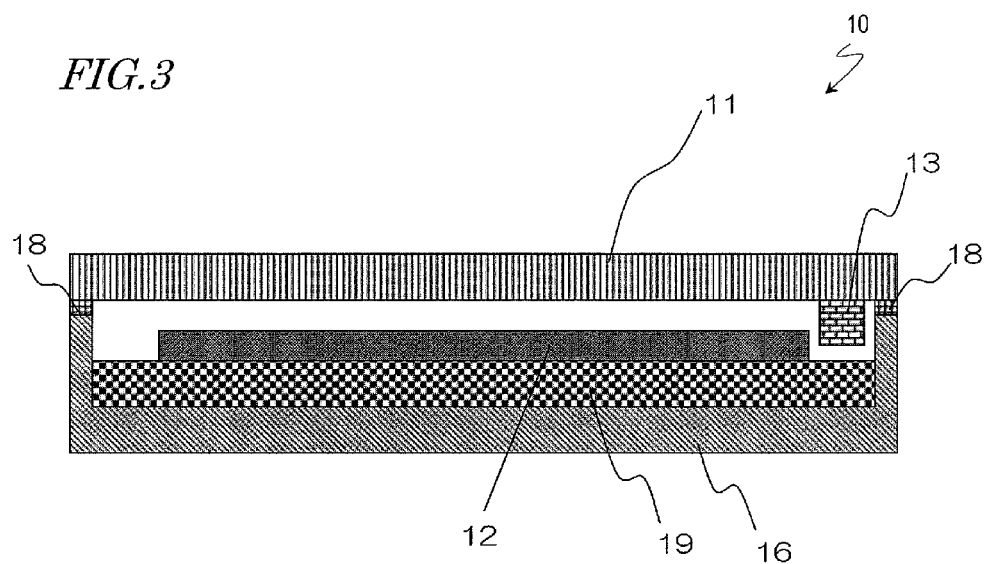
FIG. 3 is a cross-sectional view of an electronic device according to an embodiment.

Referring to FIGS. 1, 2 and 3, a general configuration of an electronic device 10 according to Embodiment 1 will be described.

FIG. 1 is a perspective view showing the appearance of the electronic device 10 on the display surface side. As shown in FIG. 1, the electronic device 10 includes a display section 12, a touch panel 11, and a casing 16.

FIG. 2 is a block diagram showing a configuration of the electronic device 10. FIG. 3 is a cross-sectional view of the electronic device 10.

As shown in FIG. 2, the electronic device 10 includes the display section 12, a display control section 32, the touch panel 11, a touch panel control section 31, a vibrating section 13, a vibration control section 33, a camera 15, a camera control section 35, an external communication section 36, various I/Os 37, a reproduction section 14, a ROM (Read only memory) 38, a RAM (Random Access Memory) 39, a speaker 17, and a microcomputer 20.

The microcomputer 20 performs various processes in accordance with a program stored in the ROM 38 or the RAM 39. The microcomputer 20 controls the electronic device 10 as a whole.

The ROM 38 stores electronic information. The electronic information includes program information such as programs and applications.

The RAM 39 is formed by a volatile medium which retains electronic information only while the power is ON or a non-volatile medium which retains electronic information also while the power is not ON. Volatile media include DRAMs (Dynamic Random Access Memories), etc., and non-volatile media include HDDs (Hard Disk Drives), flash memories, etc. Content data is stored in the RAM 39. Note that while the RAM 39 built in the electronic device 10 is used as the memory for storing content data, the present invention is not limited to this. For example, content data may be stored in an external storage medium that can be connected to the electronic device 10. An external storage medium is, for example, a semiconductor memory (a memory card, a USB memory), an HDD, an optical disc, etc. Where content data is stored in a flash memory in a memory card, the electronic device 10 may include a card slot to/from which a memory card storing content data can be attached/detached.

The reproduction section 14 reads out content data from the RAM 39 to generate and output reproduce data to the display control section 32 and/or the speaker 17. When generating the reproduce data, the reproduction section 14 performs various processes on the content data read out from the RAM 39. For example, the reproduction section 14 performs a signal separation process, an expansion process, various image processes, a sound process, etc. The content data to be read out from the RAM 39 may be any of various types, such as movie data, still image data, sound data, text data, etc. For example, where the content data is movie data, the reproduction section 14 outputs video data to the display control section 32 and sound data (e.g., music data) to the speaker 17.

The display section 12 displays the content reproduced by the reproduction section 14. The display section 12 can display information representing the control state of the electronic device 10, and control information which is information for controlling the electronic device 10. The display section 12 may be a known display device of a liquid crystal type, an organic EL type, an electronic paper type, a plasma type, etc., for example.

The display control section 32 processes the reproduce data sent from the reproduction section 14 to display a video image on the display section 12. Based on the control signal generated by the microcomputer 20, the display control section 32 displays control information, such as characters, numbers, shapes or keyboards, on the display section 12.

When the user performs a touch operation on the touch panel 11, the touch panel 11 detects the touch position. The touch panel 11 is arranged on the display surface side of the display section 12. The touch panel 11 may be a touch panel of an electrostatic type, a resistive type, an optical type, an ultrasonic type, an electromagnetic type, etc. The touch panel 11 is an example of the operation section. The touch panel 11 is an example of the panel member.

The touch panel control section 31 obtains the position of the touch operation by the user detected by the touch panel 11, and sends the position information to the microcomputer 20. The microcomputer 20 interprets the instruction meant by the touch operation by the user, based on the position information sent from the touch panel control section 31 and the control information displayed on the display section 12. Thus, the user can operate the electronic device 10 by performing a touch operation on the touch panel 11 using a finger or a pen.

The vibrating section 13 vibrates the touch panel 11. The vibration control section 33 controls the vibrating section 13 based on an instruction from the microcomputer 20. The details of the configuration, the state of attachment, etc., of the vibrating section 13 will be described later.

The camera 15 captures an image of the scene around the electronic device 10. The camera control section 35 controls the camera 15 based on an instruction from the microcomputer 20.

The external communication section 36 communicates with an external device. For example, the external communication section 36 communicates with a server via the Internet, or connects to a personal computer, or the like, to exchange data therewith. Thus, the electronic device 10 can receive content data from an external device. The microcomputer 20 stores content data obtained via the external communication section 36 in the RAM 39.

FIG. 3 is a cross-sectional view of the electronic device 10.

The display section 12 and a circuit substrate 19 are accommodated in the casing 16. The microcomputer 20, the ROM 38, the RAM 39, various control sections, a power source, etc., are arranged on the circuit substrate 19. The touch panel 11, the vibrating section 13 and the display section 12 are each electrically connected to the circuit substrate 19.

The touch panel 11 is attached to the casing 16 via a spacer 18. The touch panel 11 is arranged so as to cover the display surface of the display section 12. While the touch panel 11 is configured so as to cover the entire surface of the display surface of the display section 12 in the present embodiment, the present invention is not limited to this as long as it is configured so as to cover at least a portion of the display surface.

The spacer 18 is a connection member for connecting the touch panel 11 to the casing 16. The spacer 18 is preferably a shock-absorbing member such as a silicone rubber or a urethane rubber. By using a shock-absorbing member as the spacer 18, the vibration of the touch panel 11 is unlikely to be transmitted to the casing 16.

The vibrating section 13 is attached to the touch panel 11. The vibrating section 13 vibrates, thereby vibrating the touch panel 11. Thus, the user can feel the change in the tactile sensation received from the touch panel.

[1-2. Configuration of Vibrating Section 13]

Figure 4:
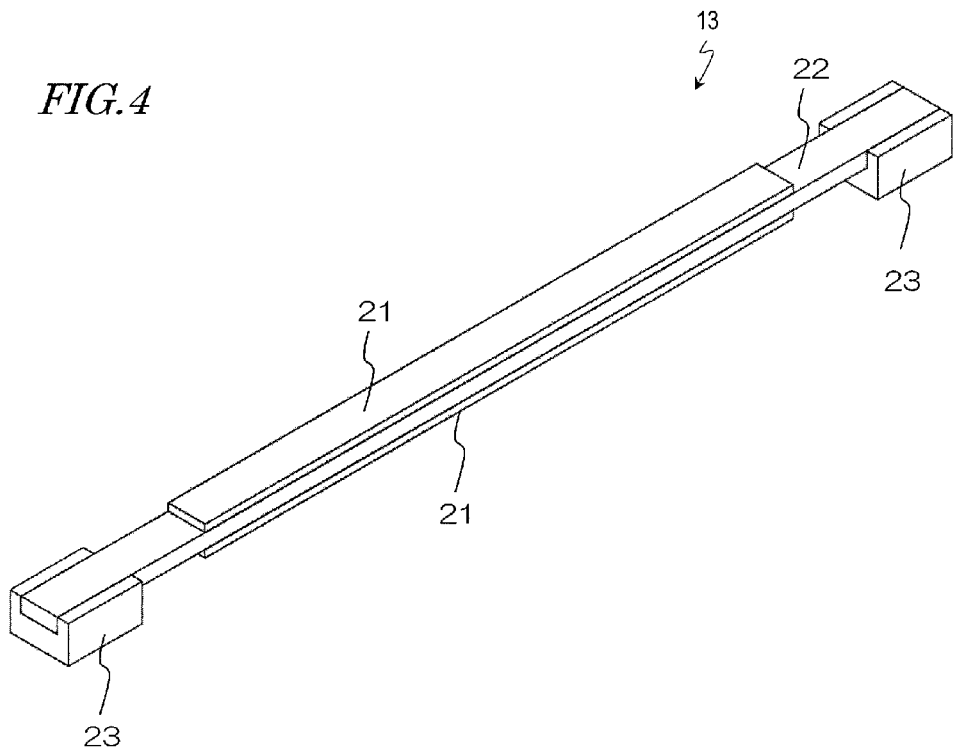
FIG. 4 is an external perspective view of a vibrating portion according to an embodiment.

The configuration of the vibrating section 13 will be described with reference to FIG. 4. FIG. 4 is a perspective view of the vibrating section 13 of the present embodiment. The vibrating section 13 includes piezoelectric elements 21, a shim plate 22, and bases 23. The piezoelectric elements 21 are bonded on opposite sides of the shim plate 22. The opposite ends of the shim plate 22 are attached to the bases 23, thereby forming a so-called fixed-fixed structure. The bases 23 are connected to the touch panel 130.

The piezoelectric element 21 is made of, for example, piezoelectric ceramic of lead zirconate titanate, or the like, or piezoelectric single crystal of lithium niobate, or the like. A voltage from the vibration control section 33 is applied to the piezoelectric elements 21. The piezoelectric elements 21 are stretched and shrunk in accordance with the voltage applied thereto. The vibration control section 33 performs a control such that one of the piezoelectric elements 21 bonded on opposite sides of the shim plate 22 stretches while the other shrinks. Then, the first one is controlled to shrink while the other stretches. This is repeated thereafter. This bends the shim plate 22, thereby generating a vibration.

The shim plate 22 is a spring member of phosphor bronze, etc. The vibration of the shim plate 22 vibrates the touch panel 11 via the base substrate 23. Thus, the user operating the touch panel can feel the vibration of the touch panel.

The bases 23 may be a metal such as aluminum or brass, or a plastic such as PET or PP.

The frequency, amplitude and cycle of vibration are controlled by the vibration control section 33. The frequency of vibration is for example about 100 to 400 Hz.

Note that while the piezoelectric elements 21 are attached to the shim plate 22 in the present embodiment, the piezoelectric elements 21 may be attached directly to any of the members of the electronic device 10, e.g., the touch panel 11, the display section 12, or the casing 16. Alternatively, a thin-film transparent piezoelectric member may be formed on the touch panel 11 by a method such as sputtering, and used as the vibrating section 13. Where a cover member, or the like, is present on the touch panel 11, the piezoelectric elements 21 may be attached to the cover member. Note that where the touch panel 11 is vibrated by the vibrating section 13, the touch panel 11 is an example of the panel member. Where a cover member is provided so as to cover the touch panel 11, and the cover member is vibrated by the vibrating section 13, the structure including the touch panel 11 and the cover member is an example of the panel member.

While the touch panel 11 and the display section 12 are separate components in this example, the touch panel 11 and the display section 12 may be formed as an integral member. For example, an in-cell type touch panel may be employed where the touch panel function is integrated inside a liquid crystal panel, or an on-cell type touch panel may be employed where the touch panel function is integrated on the surface of a liquid crystal panel.

While the vibrating section 13 using the piezoelectric element 21 has been described as an example, the present invention is not limited to this, and a vibrating section using a vibration motor may be used, for example.

[1-3. Configuration of Screen]

Figure 5:
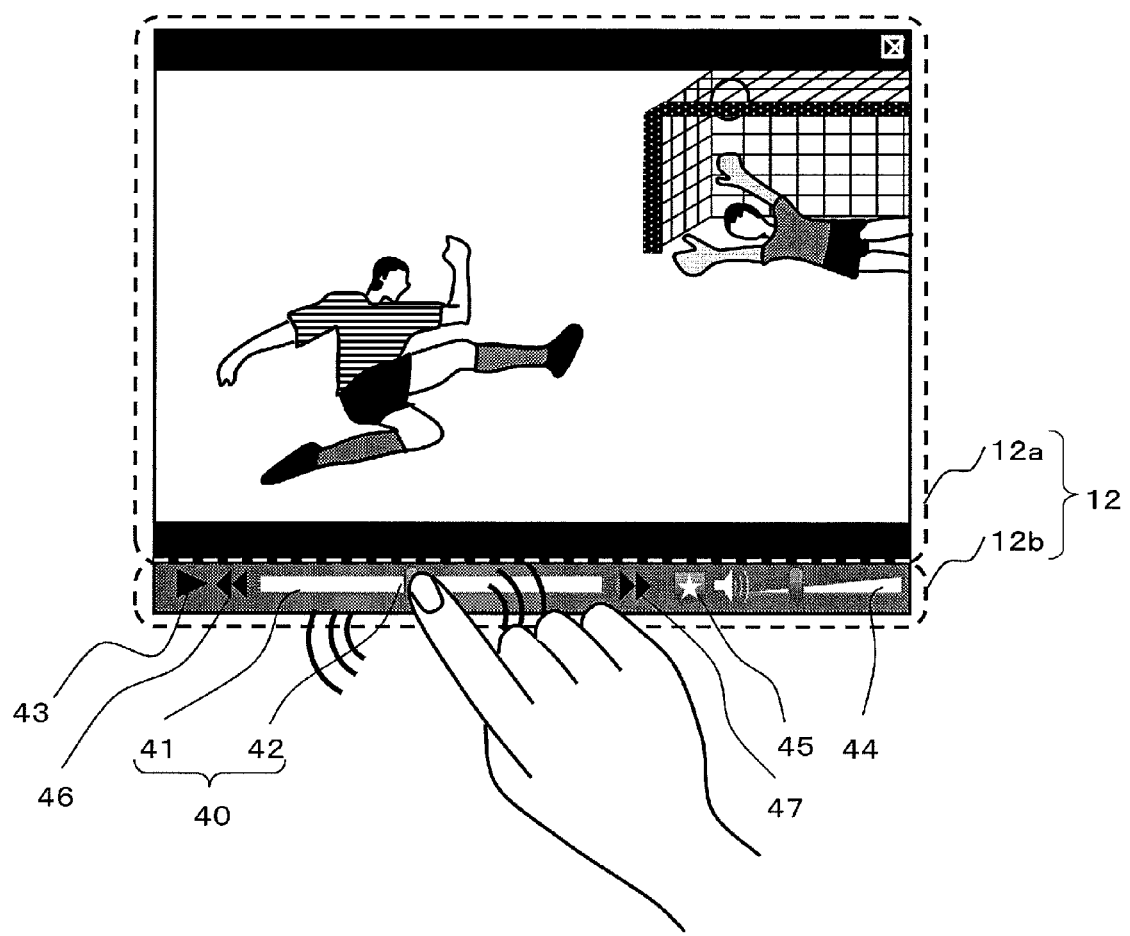
FIG. 5 is a diagram showing a display screen according to an embodiment.

Referring to FIG. 5, the configuration of the screen displayed on the display section 12 when reproducing movie content will be described.

It is herein assumed that a soccer-related movie is being reproduced as an example of a content item. It is assumed that the total reproduction time of this movie is 10 minutes, and there is a goal scene where a player scores a goal at the reproduction time of 5:30. It is assumed that the goal scene is registered in advance as a "favorite scene". A "favorite scene" is an example of the specified reproduction position. Then, the touch panel 11 vibrates when the user's finger approaches the reproduction position corresponding to a favorite scene. Based on this vibration, the user can easily find a favorite scene.

As shown in FIG. 5, the image displayed on the display section 12 includes a display area 12a where the content item is displayed, and an operation area 12b where user operations are accepted. Movie data reproduced by the reproduction section 14 is displayed in the display area 12a. Displayed in the operation area 12b are a time bar 40 representing the reproduction position of the movie, a reproduction button (stop button) 43, a volume adjustment section 44 for controlling the sound volume, a favorite registration button 45, a rewind button 46, a fast forward button 47, etc. The time bar 40, the reproduction button 43 and the volume adjustment section 44 are examples of the control information.

The time bar 40 includes a bar 41 representing the time axis from the start of reproduction to the end of reproduction of the movie, and a slider 42 representing the current reproduction position. The bar 41 has a rectangular shape elongated in the horizontal direction, where the left end of the bar 41 represents the reproduction start position and the right end represents the reproduction end position.

[2. Operation]

Operations of the electronic device 10 having such a configuration will be described in greater detail. Operations to be described below are an operation when the user registers a "favorite scene", and an operation when the user searches for a "favorite scene" during reproduction.

[2-1. Registration Operation]

Figure 6:
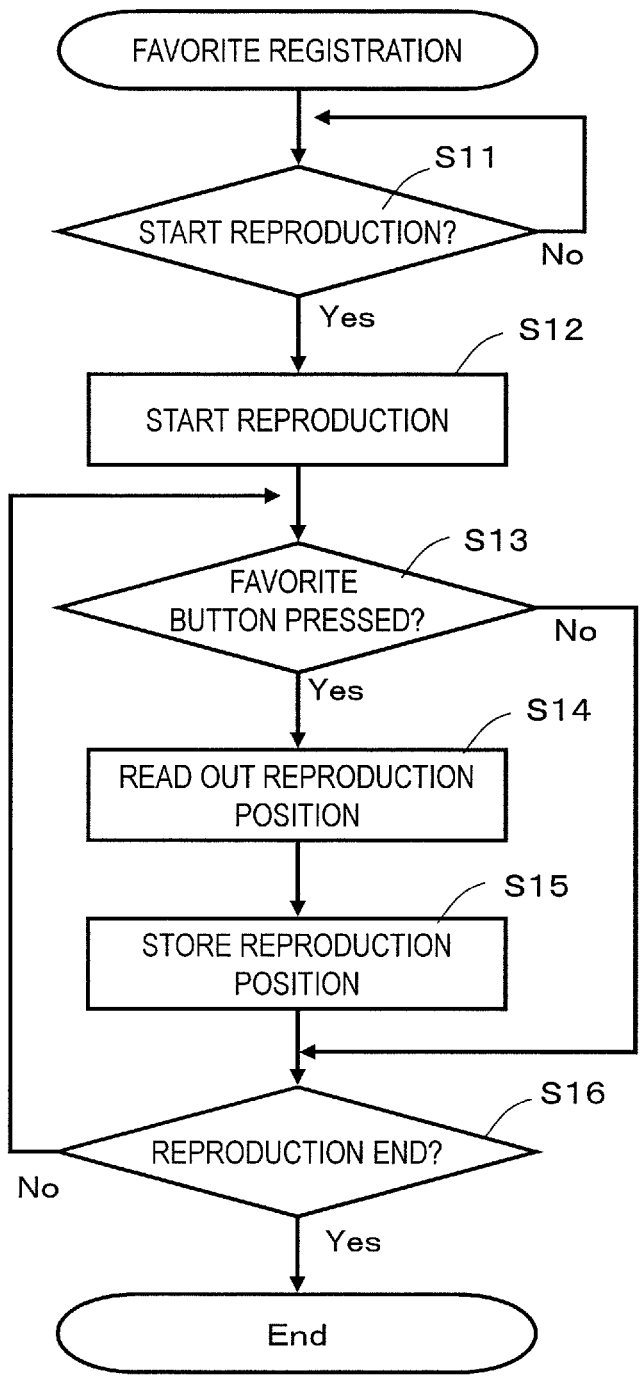
FIG. 6 is a flow chart illustrating a favorite registration operation according to an embodiment.

The user can register a favorite scene in the movie in advance. An operation where the user registers, as a favorite, a goal scene at the point in time 5:30 from the start of reproduction will now be described with reference to FIG. 6. FIG. 6 is a flow chart illustrating the favorite registration operation.

The microcomputer 20 monitors whether the reproduction button 43 is touched by the user (S11).

When the reproduction button 43 is touched by the user, the microcomputer 20 gives the reproduction section 14 an instruction to reproduce the content item. In response to this, the reproduction section 14 reads out the content data from the RAM 39 and generates the reproduce data (S12). The reproduced movie is displayed in the display area 12a of the display section 12. As the reproduction of the movie starts, the display of the reproduction button 43 is switched to the display of the stop button.

The microcomputer 20 monitors whether the favorite button 45 is operated by the user while the content item is being reproduced (S13).

In step 13, if the favorite button 45 is not operated, the process proceeds to the operation of step 16. In step 13, if the favorite button 45 is operated by the user, the microcomputer 20 reads out from the RAM 39 information representing the reproduction position of the content item being reproduced (S14). Specifically, if the favorite button 45 is operated at the 5:30 position, the microcomputer 20 reads out from the RAM 39 information indicating that the position is 5:30 from the start position of the content item.

Then, the microcomputer 20 stores in the RAM 39 the read-out reproduction position information as information representing the favorite position (S15). Thus, the favorite reproduction position is registered.

Then, the microcomputer 20 monitors whether the stop button 43 is operated by the user (S16). If the stop button 43 is not operated, the process returns to step 13. If the favorite button 45 is operated in this state, favorite registration is done again. Only one favorite, or a plurality of favorites, may be allowed to be registered for one movie data. On the other hand, if the stop button 43 is operated in step 16, the microcomputer 20 instructs the reproduction section 14 to stop the reproduction of the content item, thus ending the reproduction operation.

[2-2. Favorite Search Operation]

Figure 7:
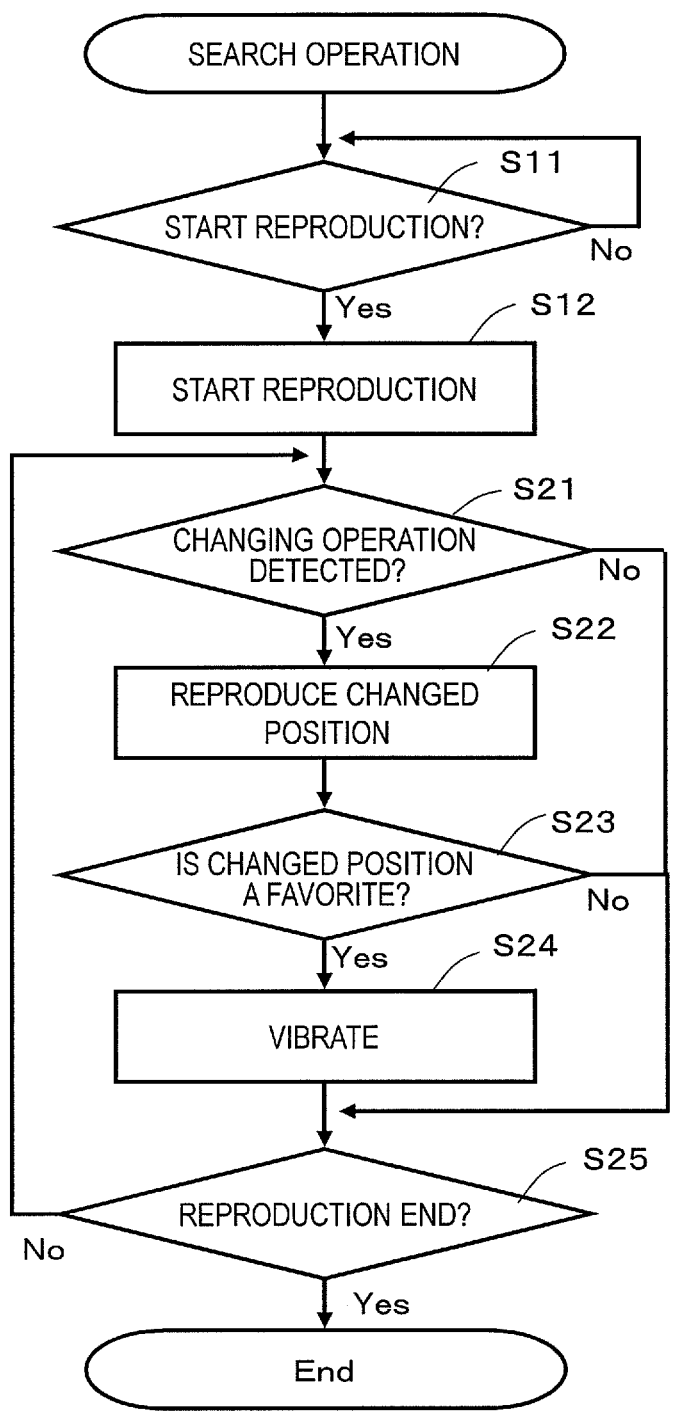
FIG. 7 is a flow chart showing an operation of searching for a registered favorite position according to an embodiment.

Next, an operation of searching for an already-registered favorite reproduction position will be described with reference to FIG. 7. FIG. 7 is a flow chart illustrating an operation of searching for a registered favorite position.

The microcomputer 20 monitors whether the reproduction button 43 is touched by the user (S11).

When the reproduction button 43 is touched by the user, the microcomputer 20 gives the reproduction section 14 an instruction to reproduce the content item. In response to this, the reproduction section 14 reads out the content data from the RAM 39 and generates the reproduce data (S12).

In accordance with the elapsed content reproduction time, the slider 42 displayed within the time bar 40 of the operation area 12b moves to the right.

If the user touches the stop button 43, the reproduction section 14 pauses the reproduction of the movie. Then, movie data at the reproduction time at the pause is displayed as a still image on the display area 12*a*.

Since the slider 42 is displayed at a position based on the amount of time which has elapsed in the movie being reproduced, the user can grasp the reproduction position of the movie being currently reproduced by checking the position of the slider 42. Note that the color may be changed for an area of the bar 41 for which the item has been reproduced. With such a configuration, the current reproduction position is made more conspicuous.

As the content reproduction operation is started, the microcomputer 20 monitors whether an operation of changing the content reproduction position is performed (S21). Specifically, the microcomputer 20 interprets the operation as being the operation of changing the content reproduction position if the user touches within the bar 41 and performs any of the following operations. That is, the first operation is where the user touches the slider 42 and slides horizontally while keeping the touch state. The second operation is where an arbitrary position along the bar 41 where the slider 42 is absent is touched. If the first operation is detected, the microcomputer 20 instructs the reproduction section 14 to reproduce the content item in fast forward or fast rewind. If the second operation is detected, the microcomputer 20 instructs the reproduction section 14 to move the slider 42 directly to the touched position, and reproduce the content item starting from the reproduction position corresponding to the position of the moved slider 42.

In step 21, if an operation of changing the content reproduction position is not detected, the process proceeds to the operation of step 25. In step 21, if an operation of changing the content reproduction position is detected, the process proceeds to the operation of step 22.

Herein, it will be described in detail with respect to an example where the user slides the slider 42. First, while the movie is being reproduced, the user touches the slider 42 with a finger, and slides the finger along the bar 41. The touch position of the user and the change in the touch position are detected by the touch panel 11, and are sent to the microcomputer 20 via the touch panel control section 31.

The microcomputer 20 sends information regarding the touch position of the finger of the user to the display control section 32. The display control section 32 displays the slider 42 at the position corresponding to the touch position of the user based on the information sent from the microcomputer 20.

When an operation of changing the content reproduction position is detected, the microcomputer 20 instructs the reproduction section 14 to reproduce the content item starting from the moved reproduction position.

The reproduction section 14 reads out content data corresponding to the changed reproduction position from the RAM 39 to generate and output reproduce data to the display control section 32 and the speaker 17 (S22).

Using the example above, since the position at which the slider 42 is displayed corresponds to the reproduction position of the movie, the movie corresponding to the reproduction position indicated by the slider 42 is displayed in the display area 12*a*. Specifically, first, the microcomputer 20 calculates the reproduction time corresponding to the reproduction position indicated by the slider 42. Then, the information regarding the reproduction time is sent from the microcomputer 20 to the reproduction section 14. The reproduction section 14 reads out from the RAM 39 the movie data corresponding to the reproduction time sent thereto, and reproduces the movie data.

In another example, also when the user performs the second operation (an arbitrary position on the bar 41 is touched with a finger), the touch position of the user is detected as in a case where the first operation described above is performed. Then, the slider 42 is displayed at the touch position of the user. Then, the movie data at the reproduction time corresponding to the reproduction position indicated by the slider 42 is reproduced.

As described above, the user can search for a particular scene in the movie by fast-forwarding, rewinding or jump-reproducing the movie by performing the first operation or the second operation.

As the reproduction section 14 reproduces the content data at the changed reproduction position, the microcomputer 20 determines whether the changed reproduction position is registered as a favorite (S23).

Specifically, the microcomputer 20 obtains the changed position of the slider 42, and obtains the reproduction position corresponding to the position. Then, the microcomputer 20 compares the changed reproduction position with a reproduction position that is stored in the RAM 39 as a favorite position to thereby determine whether a predetermined condition is satisfied. The predetermined condition may be any of various conditions. For example, the predetermined condition may be whether the reproduction positions coincide with each other, or the predetermined condition may be whether the changed reproduction position falls within a predetermined range that is set based on a favorite reproduction position. For example, the determination is made based on whether the changed reproduction position falls within a predetermined range from 10 seconds before a favorite position to 1 second before the favorite position.

Then, if it is determined that the changed reproduction position is a position corresponding to a reproduction position registered as a favorite, the microcomputer 20 instructs the vibration control section 33 to vibrate the vibrating section 13 (S24). Thus, since the touch panel 11 vibrates when the reproduction position comes to coincide with a favorite reproduction position, the user can easily recognize when a favorite reproduction position is reached based on a change in tactile sensation.

Note that where the predetermined condition is whether the changed reproduction position falls within a predetermined range that is set based on a favorite reproduction position, the touch panel 11 vibrates when the touch position of the user comes near the favorite reproduction position. Thus, the user can recognize a vibration of the touch panel 11 before moving past the favorite reproduction position. As a result, the user can more reliably search for a favorite reproduction position.

Also during reverse reproduction, if the predetermined condition is whether the changed reproduction position falls within a predetermined range that is set based on a favorite reproduction position, the touch panel 11 will vibrate when the touch position of the user comes near the favorite reproduction position. Specifically, also when a slide operation is performed in the leftward direction from the end-of-reproduction side (on the right side of the specified reproduction position), the user can feel a vibration before the favorite reproduction position is reached if a predetermined range is set based on the favorite reproduction position. With such a configuration, even if the touch position of the user moves past the favorite reproduction position, it is possible to find the favorite reproduction position by performing the touch operation so as to move back and forth past the favorite reproduction position.

In step 23, if the microcomputer 20 determines that the changed reproduction position does not correspond to a reproduction position registered as a favorite, the process proceeds to step 25.

Next, the microcomputer 20 monitors whether the stop button 43 is operated (S25). If the stop button 43 is not operated, the microcomputer 20 returns to the operation of step 21. On the other hand, if the stop button 43 is operated, the microcomputer 20 gives the reproduction section 14 an instruction to end the reproduction operation, thus ending the reproduction operation.

While a case where the user controls the slide bar 40 has been described above, the user operation is not limited to this.

For example, the user may change the reproduction position of the content item by touching the rewind button 46 or the fast forward button 47.

Figure 8:
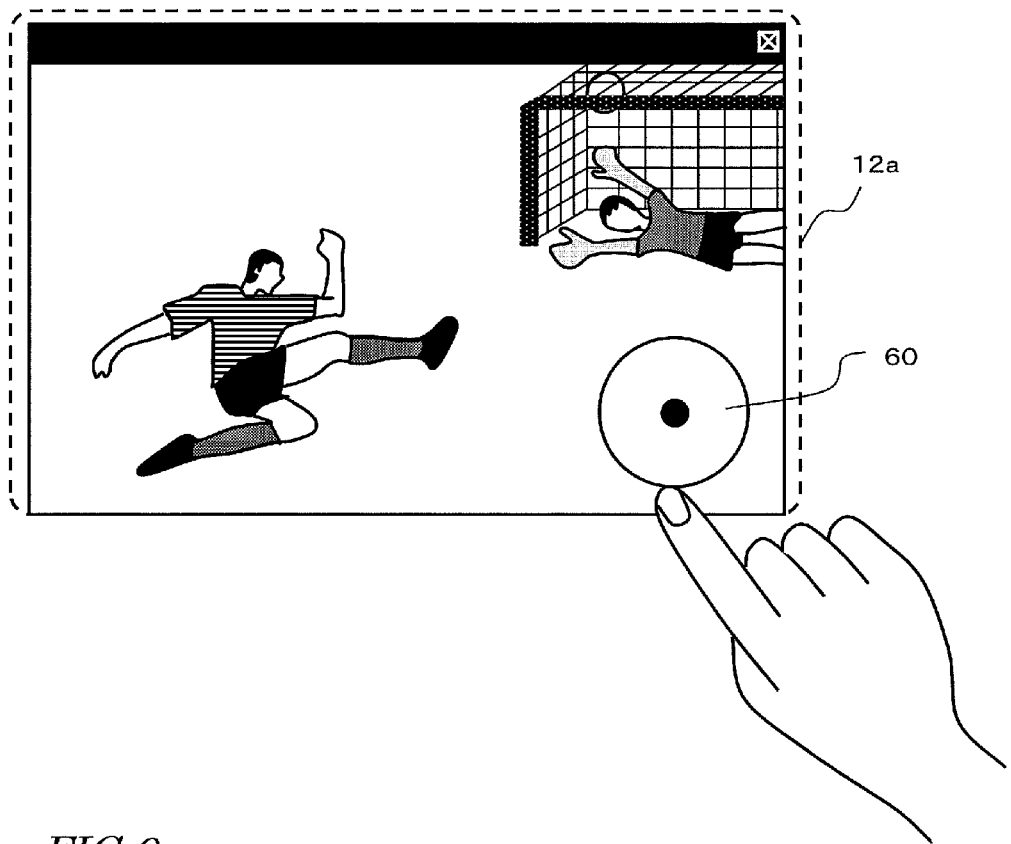
FIG. 8 is a diagram showing a display screen according to an embodiment.

As shown in FIG. 8, a jog dial 60 may be displayed instead of the seek bar 40. The user can change the reproduction position of the content item by controlling the jog dial 60 so as to rotate the jog dial 60. For example, the jog dial 60 may be rotated clockwise for fast forward and counterclockwise for rewind.

The reproduction position of the content item may be changed by directly touching the display area 12a. For example, the user may fast-forward the content item by sliding the finger from left to right on the display area 12a, and rewind the content item by sliding the finger from right to left thereon. Alternatively, the user may fast-forward the content item by touching a right-end area of the display area 12a and rewind the content item by touching a left-end area thereof.

The vibrating section 13 vibrates the touch panel 11 if the reproduction position changed through such an operation is a specified reproduction position. Thus, the user can recognize, based on a change in tactile sensation, that the reproduction position has been changed to a specified reproduction position.

Thus, by varying the vibration of the touch panel 11 depending on whether or not the changed reproduction position is a specified reproduction position, the user can recognize, based on a change in tactile sensation, that the reproduction position has been changed to a specified reproduction position. The vibration of the touch panel 11 may be varied by transitioning back and forth between a state where there is no vibration and another state where there is a vibration, or by transitioning from a vibration to another vibration. For example, one may change the frequency and the amplitude from a certain vibration, or may change the cycle on which vibrations are generated.

The acceptance of user operations may be stopped when the reproduction position changed through such an operation is a specified reproduction position. Then, when the changed reproduction position comes to coincide with a specified reproduction position, the display stops with the scene corresponding to the specified reproduction position being displayed on the display area 12a. Thus, the user can more reliably find a specified reproduction position.

[3. Summary]

As described above, the electronic device 10 according to the embodiment includes the reproduction section 14 for reproducing a content item, the touch panel 11 for detecting a user operation for changing the reproduction position of the content item, and the vibrating section 13 for vibrating the touch panel 11. The vibrating section 13 varies the vibration of the touch panel depending on whether or not the reproduction position changed through a user operation detected by the touch panel 11 is a specified reproduction position.

Thus, the touch panel 11 is vibrated by the vibrating section 13 when the reproduction position comes to coincide with a specified reproduction position. Therefore, the user can recognize, based on a change in tactile sensation, that the position has been changed to a specified reproduction position through a touch operation. Therefore, the user can more efficiently find a particular scene by utilizing not only the visual sense and the audible sense, but also the tactile sensation.

The electronic device 10 includes the display section 12 for displaying the current reproduction position of the content item reproduced by the reproduction section 14. The reproduction position of the content item is displayed by the scroll bar 40, for example. By operating the scroll bar 40, the user can easily change the reproduction position.

Now, functions and effects will be described in greater detail. When reproducing a movie (e.g., a soccer-related movie) on an electronic device having a touch panel, one may wish to search for a particular scene (e.g., a goal scene) in the movie. In such a case, the user finds a particular scene that the user wishes to see by fast-forwarding and rewinding the movie by sliding along the scroll bar displayed in the bottom portion of the screen. However, in order to determine whether it is the particular scene, the user needs to visually check the movie being reproduced while operating the time bar. Such an operation is inconvenient for the user. If the user is not used to the operation of the time bar, the user may inadvertently move past the scene of interest. Such a problem may similarly occur for content items other than movies (e.g., still images, music, sound, text, etc.). According to the present embodiment, the touch panel 11 is vibrated by the vibrating section 13 when the reproduction position corresponding to the position on the touch panel 11 indicated by the touch operation by the user comes to coincide with a specified reproduction position, as described above, thereby allowing the user to efficiently find a particular scene by utilizing not only the visual sense and the audible sense, but also the tactile sensation.

(Embodiment 2)

Next, the electronic device 10 according to Embodiment 2 will be described. In Embodiment 1, favorite scenes are registered by user operations. In the present embodiment, favorite scenes are registered based on the number of comments from the viewers.

[1. Configuration]

[1-1. Configuration of Movie Distribution System]

Figure 9:
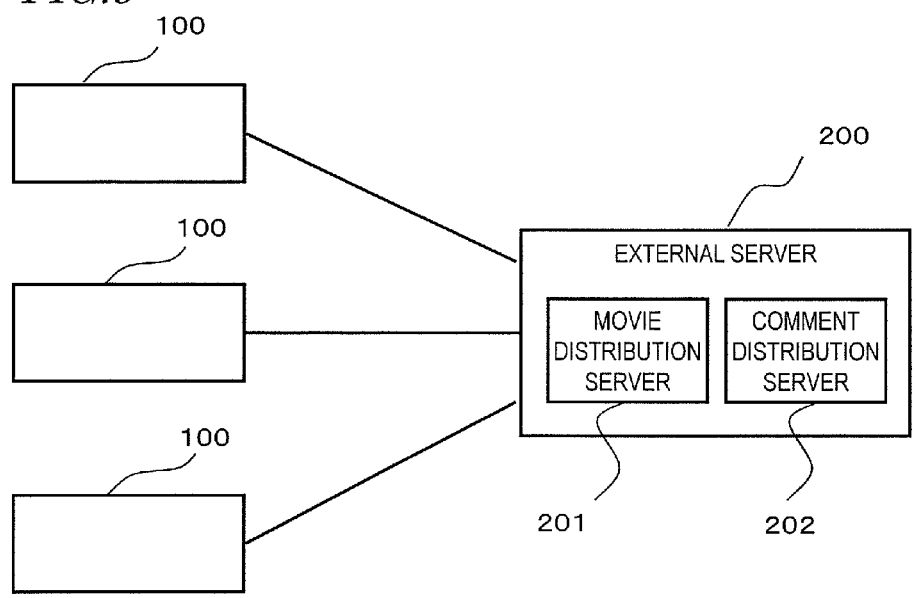
FIG. 9 is a diagram showing a configuration of a movie distribution system according to an embodiment.

FIG. 9 is a schematic diagram showing a configuration of a movie distribution system.

An external server 200 includes a movie distribution server 201, and a comment distribution server 202. The external server 200 distributes movies among terminal devices 100 in response to movie distribution requests from the terminal devices 100. The distribution is done by streaming, for example. The external server 200 can be accessed by a plurality of terminal devices 100. Thus, a plurality of users (viewers) can view movies in the movie distribution server 201. The comment distribution server 202 receives, from terminal devices 100, comments on each movie distributed by the movie distribution server 201, and distributes the comments to terminal devices 100 that are viewing the movie. The terminal devices 100 are connected, via a network, to the movie distribution server 201 and the comment distribution server 202, so as to receive movies distributed from the movie distribution server 201 and comments distributed from the comment distribution server 202. Then, each terminal device 100 displays a received movie, and displays received comments superimposed on the movie.

When a comment is input by a viewer on a movie being reproduced, the reproduction time of the movie at the point in time when the comment is input is set as the comment submission time. Then, the input comment and the comment submission time are stored as comment data in the comment distribution server 202. That is, the comment of the viewer is stored in the comment distribution server 202 while being associated with the reproduction time of the movie data. The electronic device 10 functions as a terminal device 100.

[1-2. Configuration of Screen]

Figure 10:
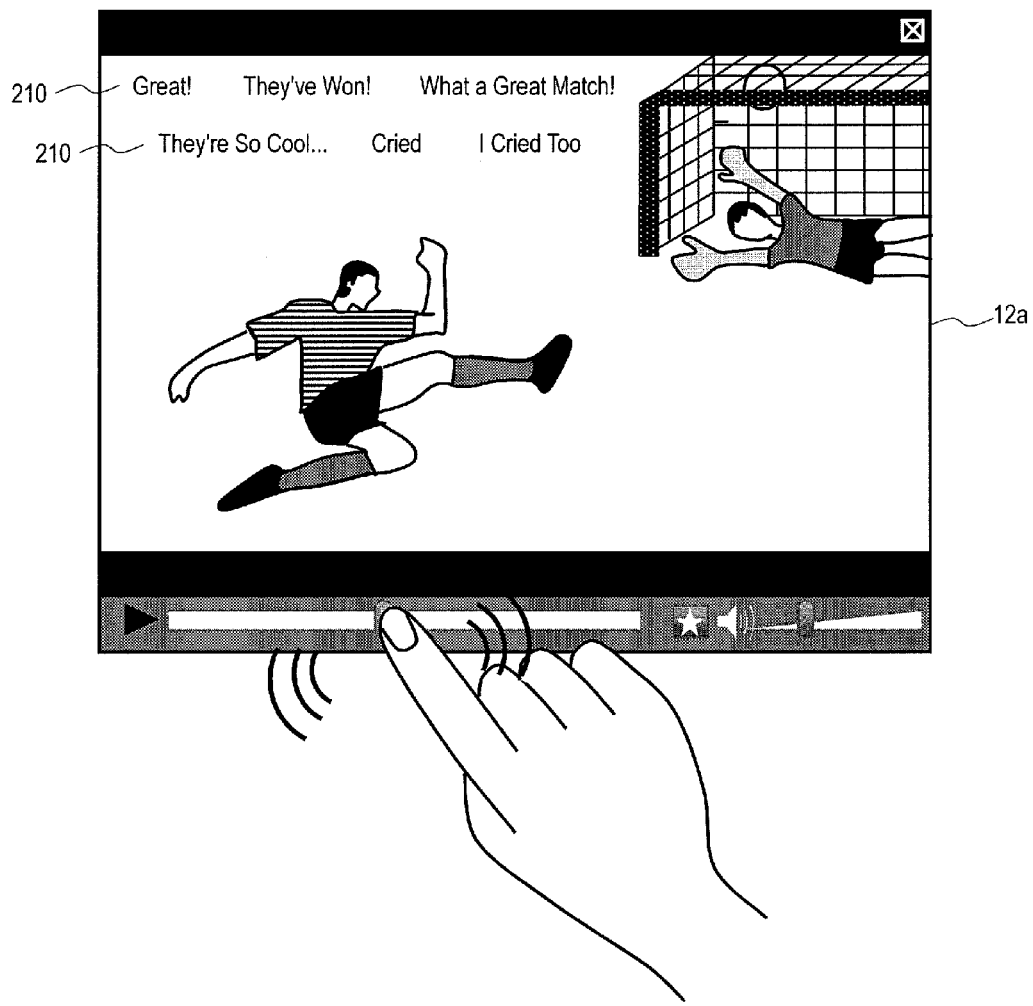
FIG. 10 is a diagram showing a display screen according to an embodiment.

FIG. 10 shows an example of a movie and comments displayed on the display section 12. As shown in FIG. 10, comments 210 which have been input by viewers on the movie are displayed together with the movie. Herein, consider a case where a soccer-related movie is being reproduced as a content item, as in Embodiment 1. A goal scene where a player scores a goal is displayed, together with the comments 210 of viewers given on this goal scene, in the display area 12*a*.

[2. Operation]

An operation of the electronic device 10 of the present embodiment will now be described. The operation to be described below is an operation where the microcomputer 20 determines a favorite scene with reference to the number of comments for each reproduction position.

[2-1. Operation of Determining Favorite Scene]

Figure 11:
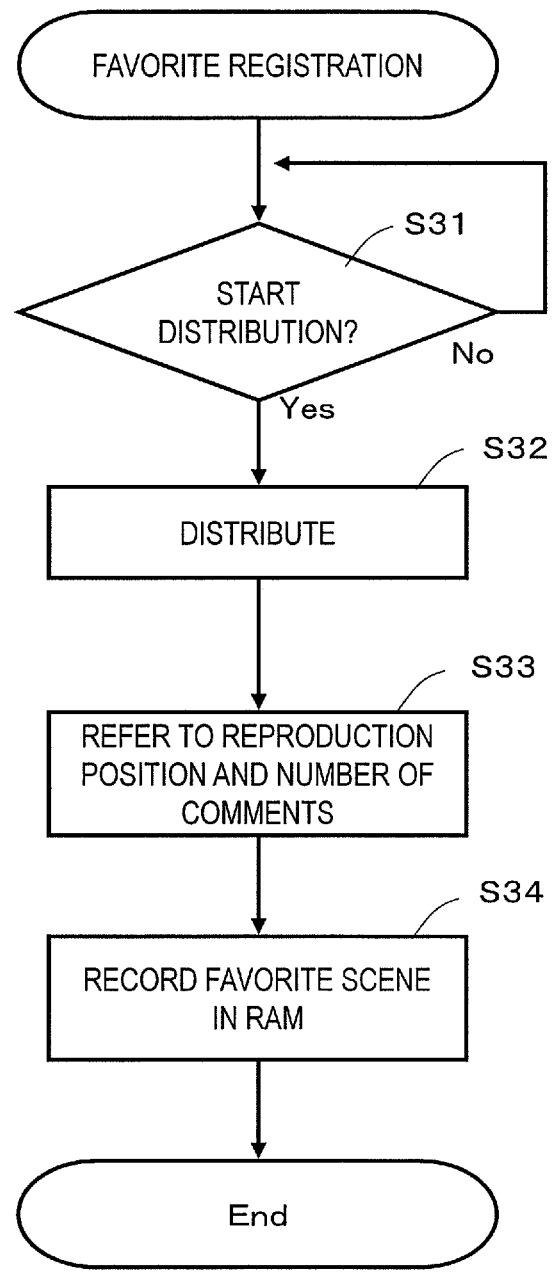
FIG. 11 is a flow chart showing a favorite registration operation according to an embodiment.

FIG. 11 is a flow chart illustrating the favorite scene determining operation.

The microcomputer 20 monitors whether movie data and comment data are distributed from the external server 200. When the user gives an instruction to start distribution, the external server 200 distributes movie data and comment data to the electronic device 10 (S32).

The microcomputer 20 refers to the number of comments for each reproduction position included in the distributed comment data (S33). Then, the microcomputer 20 determines, as a user favorite scene, a reproduction position with the largest number of comments, for example. Specifically, the favorite scene is determined based on the number of comments per unit time. For example, a reproduction position that corresponds to a period in which the number of comments per unit time is greater than or equal to a predetermined number is determined as a user favorite scene. A plurality of periods in which the number of comments is greater than or equal to a predetermined number may be detected and each determined to be a favorite registration, or only a period with the largest number of comments may be registered as a favorite.

The unit time is a predetermined amount of time over which the number of comments is counted. For example, where the unit time is 10 seconds, the total reproduction time of the movie is split into 10-second slots, e.g., from the reproduction start point (0 second) to the reproduction time point of 10 seconds, and from the reproduction time point of 10 seconds to the reproduction time point of 20 seconds. Since a comment submission time is set for each comment of a viewer, the number of comments per unit time can be counted by referring to the comment submission time. The counted number of comments is stored in the comment distribution server 202 as comment data together with comments input and the comment submission time thereof. Note that the microcomputer 20 may count the number of comments per unit time.

While the length of the unit time may be appropriately set based on the length of the total reproduction time of the movie, it is preferably about 1 to 10% of the total reproduction time of the movie. If the length of the unit time is too short, the number of comments per unit time may no longer vary. Thus, by setting the length of the unit time to be 1% or more of the total reproduction time, the number of comments per unit time is likely to vary. If the length of the unit time is too long, it will be difficult to determine on which scene viewers have submitted comments. Thus, by setting the length of the unit time to be 10% or less of the total reproduction time, it will be clear on which scene users have submitted comments.

When a favorite scene is determined, the microcomputer 20 stores the reproduction position of the favorite scene in the RAM 39 (S34).

Therefore, the reproduction position at which the number of comments per unit time is greater than or equal to a predetermined number or is at maximum is registered as a favorite scene.

[2-2. Favorite Search Operation]

As in Embodiment 1, the user can search for a determined favorite scene by performing a touch operation on the time bar 40. For example, the touch panel 11 vibrates as the user performs a touch operation so as to slide the slider 42 and the touch position of the user reaches a reproduction position that corresponds to the favorite scene. With this vibration, the user can easily find a scene where there are many comments from other users.

There may be a plurality of periods in which the number of comments is greater than or equal to a predetermined number, and a plurality of favorite scenes may be registered. In such a case, the vibrating section 13 may strongly vibrate the touch panel 11 in those of the plurality of periods with larger numbers of comments, while less strongly vibrating the touch panel 11 in those periods with smaller numbers of comments. By varying the vibration depending on the number of comments, it is possible to feel, by the vibration, the level of enthusiasm of the viewers.

(Embodiment 3)

Next, the electronic device 10 according to Embodiment 3 will be described. In the present embodiment, it is determined whether a scene is an important one based on the variation in the intensity of a sound signal such as the cheering voice in the movie data.

[1. Configuration]

[1-1. Configuration of Screen]

Figure 12:
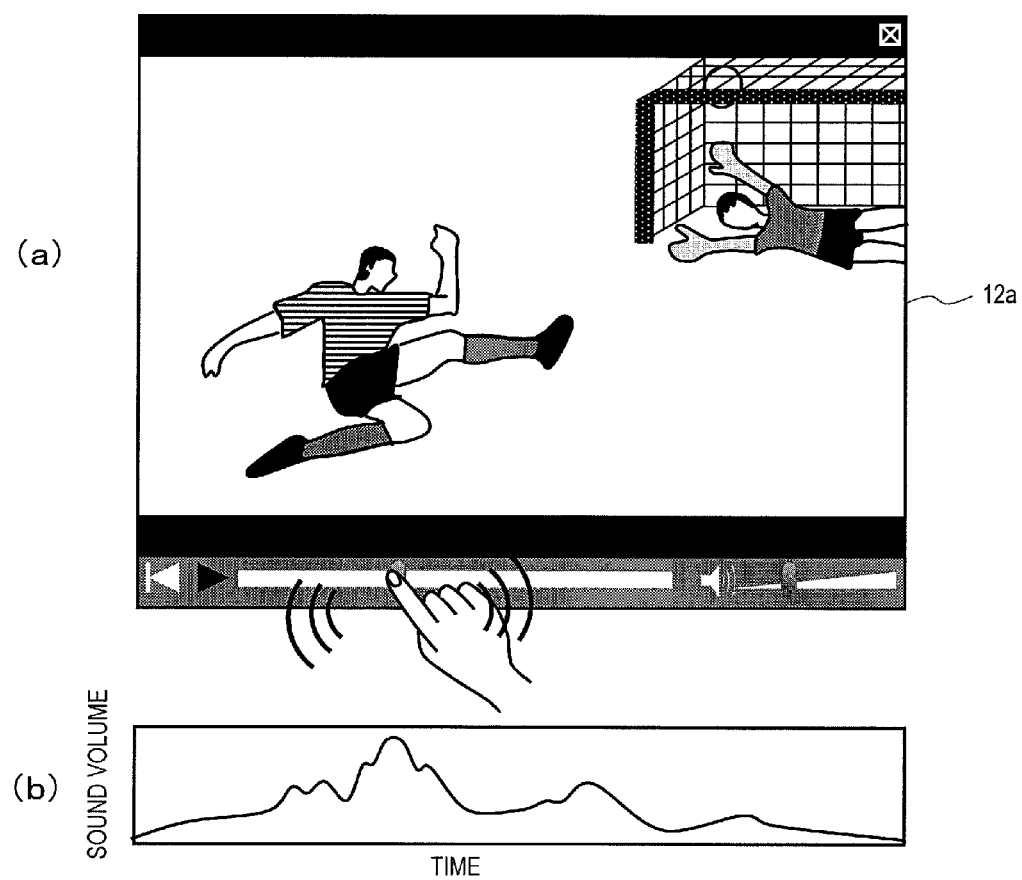
FIG. 12($a$) and FIG. 12($b$) are diagrams showing a display screen and the transition of the sound volume over the reproduction time according to an embodiment.

FIG. 12(*a*) is a schematic diagram showing an example of a movie displayed on the display section 12 of the electronic device 10 and a user operation, and FIG. 12(*b*) is a diagram showing the transition of the sound volume over the reproduction time of the movie.

In a movie related to a sport such as soccer, there is a loud cheering voice in most exciting scenes such as goal scenes. In the present embodiment, an important scene is set by using the intensity of the sound signal in the movie data.

[2. Operation]

[2-1. Favorite Registration Operation]

Figure 13:
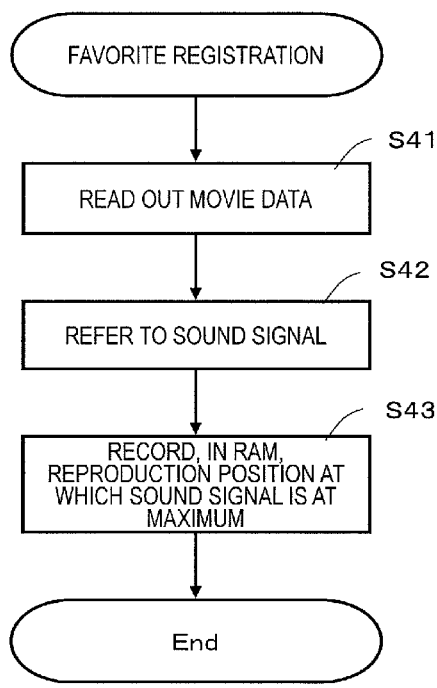
FIG. 13 is a flow chart illustrating a favorite registration operation according to an embodiment.

FIG. 13 is a flow chart illustrating an operation of determining a favorite scene based on the intensity of the sound signal.

The microcomputer 20 reads out the movie data stored in the RAM 39 (S41). Then, the microcomputer 20 refers to the sound signal included in the movie data to detect a reproduction position at which the intensity of the sound signal is at maximum (S42). The point at which the intensity of the sound signal is at maximum is, for example, where the amplitude of the sound data is at maximum.

Then, the microcomputer 20 stores information regarding the detected reproduction position in the RAM 39 (S43).

Thus, the reproduction position at which the sound signal is at maximum is registered as a favorite scene.

Note that with a movie of a sport, or the like, the level of importance is determined based on the loudness of the cheering voice of the crowd. The cheering voice of the crowd can be extracted as a high-frequency component. One may extract only a particular frequency component corresponding to human voice, and refer to the intensity of the particular frequency component.

While a portion where the amplitude of the sound data is at maximum is set as a favorite scene, one may set, as an important scene, a scene where the amplitude of the sound data increases gradually. This is because in a movie of a sport, or the like, the cheering voice of the crowd increases gradually when an important scene approaches.

A plurality of reproduction positions where the sound volume is greater than or equal to a predetermined sound volume may be detected and registered as favorites, or only a reproduction position at which the sound volume is at maximum may be registered as a favorite.

[2-2. Favorite Search Operation]

As in Embodiment 1, the user can search for a determined favorite scene by performing a touch operation on the time bar 40. For example, the touch panel 11 vibrates as the user performs a touch operation so as to slide the slider 42 and the touch position of the user reaches a reproduction position that corresponds to the favorite scene. By this vibration, the user can easily find a scene with a loud cheering voice.

The touch panel 11 may be more strongly vibrated at a reproduction position where the cheering voice is louder than at a reproduction position where the cheering voice is less loud, and by varying the vibration of the touch panel 11 depending on the sound volume, it is possible to feel, by the vibration, the level of enthusiasm of the viewers.

The intensity of the vibration of the touch panel 11 may be varied gradually in accordance with the change in the cheering voice of the crowd. That is, the intensity of the vibration may be low when the cheering voice of the crowd is low, and the intensity of the vibration may be increased gradually in accordance with the gradual increase in the cheering voice of the crowd, with the intensity of the vibration being maximized when the cheering voice of the crowd is at maximum.

(Embodiment 4)

Next, the electronic device 10 according to Embodiment 4 will be described. In the present embodiment, vibration waveform data, movie data and data relating to favorite scenes are stored in terminal devices of other users. A user receives movie data from terminal devices of other users, and reproduces the movie on the user's own terminal device.

Figure 14:
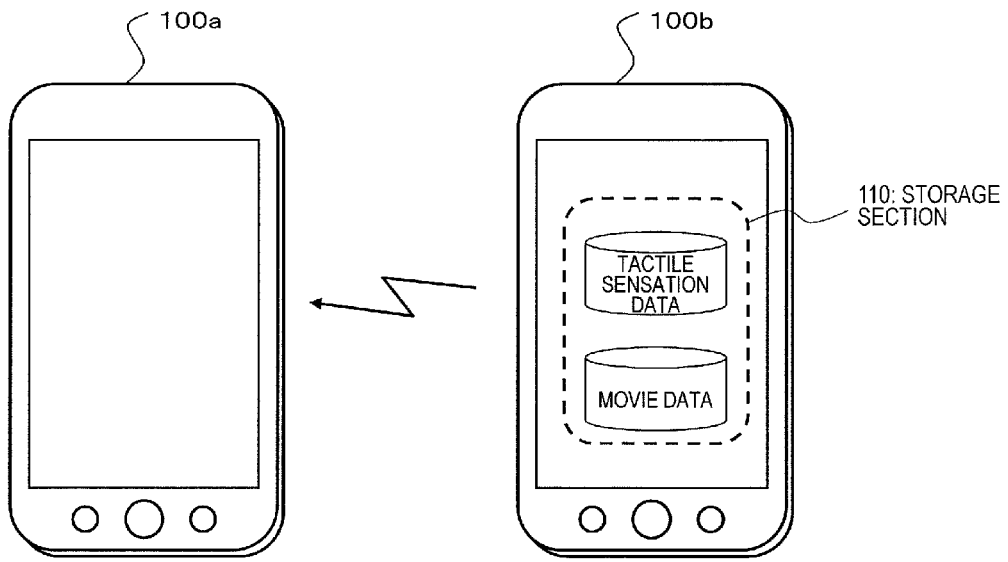
FIG. 14 is a diagram showing a movie distribution system according to an embodiment.

FIG. 14 is a diagram showing a movie distribution system of Embodiment 4. Assume that User A owns a terminal device 100a, and User B owns a terminal device 100b. The terminal devices 100a and 100b each correspond to the electronic device 10.

Movie data and vibration data are stored in a storage section (RAM) 110 in the terminal device 100b. The movie data contains information regarding a favorite scene of User B. The vibration data contains information regarding a vibration pattern (the amplitude, the frequency, etc.) of the vibration to be generated when the touch position of the user comes close to the reproduction position corresponding to the favorite scene.

As User A operates the terminal device 100a, the movie data and the vibration data of the terminal device 100b are distributed to the terminal device 100a. The distributed movie data and vibration data are stored in the RAM in the terminal device 100a. The terminal device 100a reproduces a movie based on the distributed movie data. Then, when User A performs a touch operation on the time bar and the touch position of the user comes close to the reproduction position corresponding to the favorite scene, a vibration is generated in accordance with the vibration data. Thus, User A can easily find a favorite scene which has been set by User B.

Note that while movie data and vibration data are distributed to one terminal device in the present embodiment, the data may be distributed to a plurality of terminal devices. Then, a plurality of users can enjoy the movie.

While the present embodiment employs a configuration where movie data and vibration data in the terminal device 100b are distributed, the terminal device which distributes movie data may be separate from the terminal device which distributes vibration data. Moreover, information regarding favorite scenes may be distributed from a plurality of terminal devices. Then, the user can better enjoy the movie as the user can know favorite scenes of various users.

(Embodiment 5)

Next, the electronic device 10 according to Embodiment 5 will be described. In the present embodiment, still images are used as content items.

[1. Configuration]

[1. Configuration of Screen]

Figure 15:
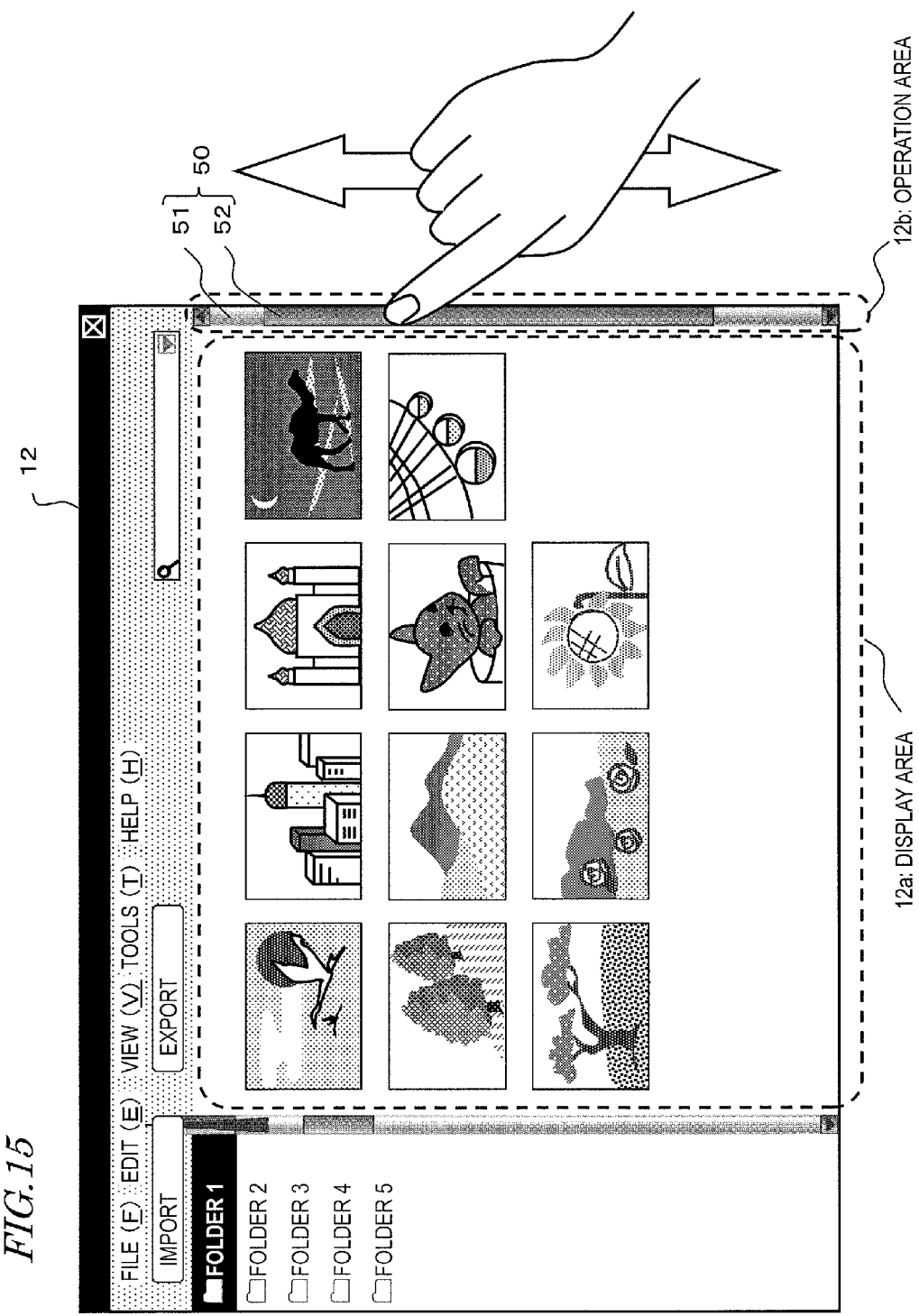
FIG. 15 is a diagram showing a display screen according to an embodiment.

Referring to FIG. 15, the screen to be displayed on the display section 12 of the electronic device 10 when reproducing still image content items will be described.

The display section 12 includes the display area 12a and the operation area 12b. A plurality of still images are displayed in thumbnails in the display area 12a. Still images displayed in the display area 12a are, for example, pictures taken by the user or images download from the Internet.

A scroll bar 50 is displayed in the operation area 12b. The scroll bar 50 includes a bar 51 and a slider 52. By operating the slider 52, the user can scroll the still image data displayed in the still image display area 12a. Still images corresponding to the position of the slider 52 are displayed in the still image display area 12.

The scroll bar 50 will be described in detail. When a plurality of still images are displayed in thumbnails, there may be cases where the still images cannot all be displayed within the still image display area 12a. In such a case, some of the still images are displayed in the still image display area 12a. Then, the position of the slider 52 represents a part of the entire still image data that is being displayed. By operating the scroll bar 50, the user can scroll the still image data displayed in thumbnails. Specifically, still images being currently displayed can be moved out of the display area 12a while still images that were not displayed in the still image display area 12a are moved into the still image display area 12a. By changing the position of the slider 52, still images corresponding to the position of the slider 52 are displayed in the still image display area 12a.

While a user operation using the scroll bar 50 has been described above, the user operation is not limited to this. For example, such a user operation as described above in Embodiment 1 can also be applied to the present embodiment.

[2. Operation]

[2-1. Registration Operation]

Figure 16:
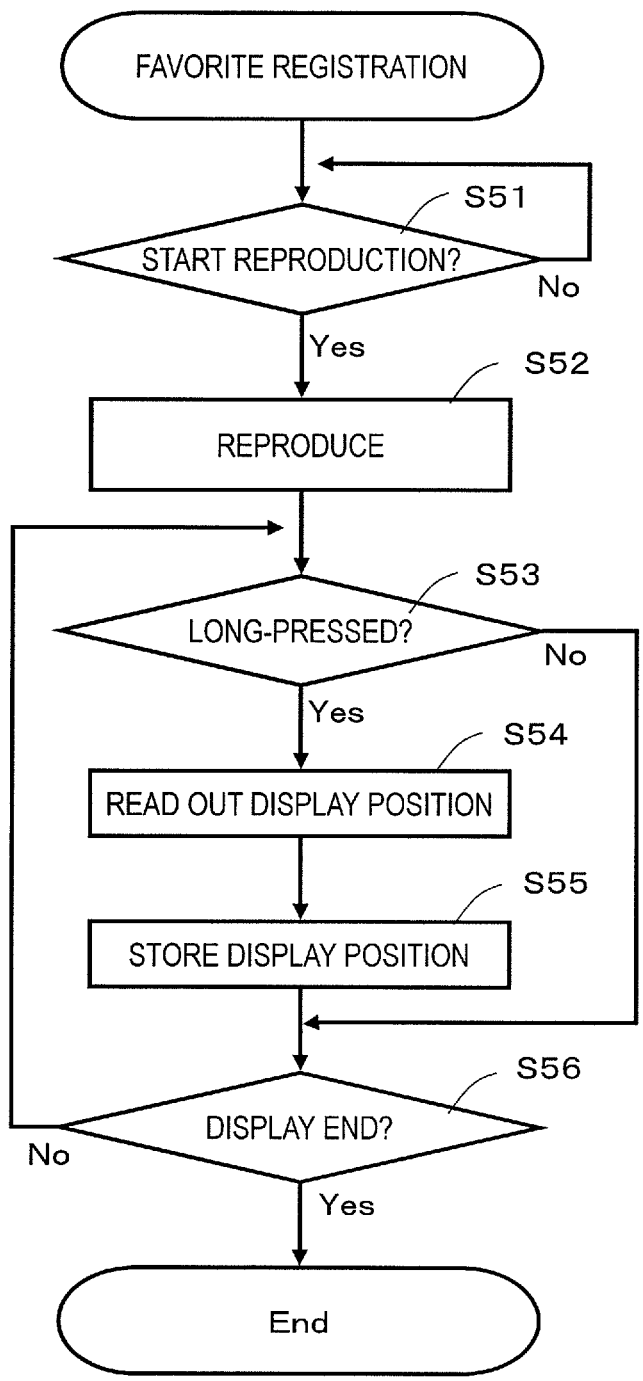
FIG. 16 is a flow chart illustrating a favorite registration operation according to an embodiment.

The user can select favorite still images out of a plurality of still images, and register those still images as favorite images in advance. FIG. 16 is a flow chart illustrating an operation of registering a favorite image.

The microcomputer 20 monitors whether the reproduction of still images is started (S51). When the reproduction of still images is started, the microcomputer 20 gives the reproduction section 14 an instruction to reproduce still images. In response to this, the reproduction section 14 reads out still image data from the RAM 39 and generates the reproduce data (S52). The reproduced still images are displayed in thumbnails in the still image display area 12a.

Then, the microcomputer 20 monitors whether a specified one of the still images displayed in thumbnails is long-pressed (S53). For example, when a still image continues to be pressed over 1 second or more, it is determined to have been long-pressed. When a specified still image is long-pressed, the microcomputer 20 reads out from the RAM 39 information regarding the display position of the long-pressed still image (S54). Then, the microcomputer 20 stores the read-out display position information in the RAM 39 as information representing the position of the favorite image (S55). Thus, the display position of the favorite position is registered.

As the user performs an operation to end the still image display, the reproduction ends (S56).

[2-2. Search Operation]

Figure 17:
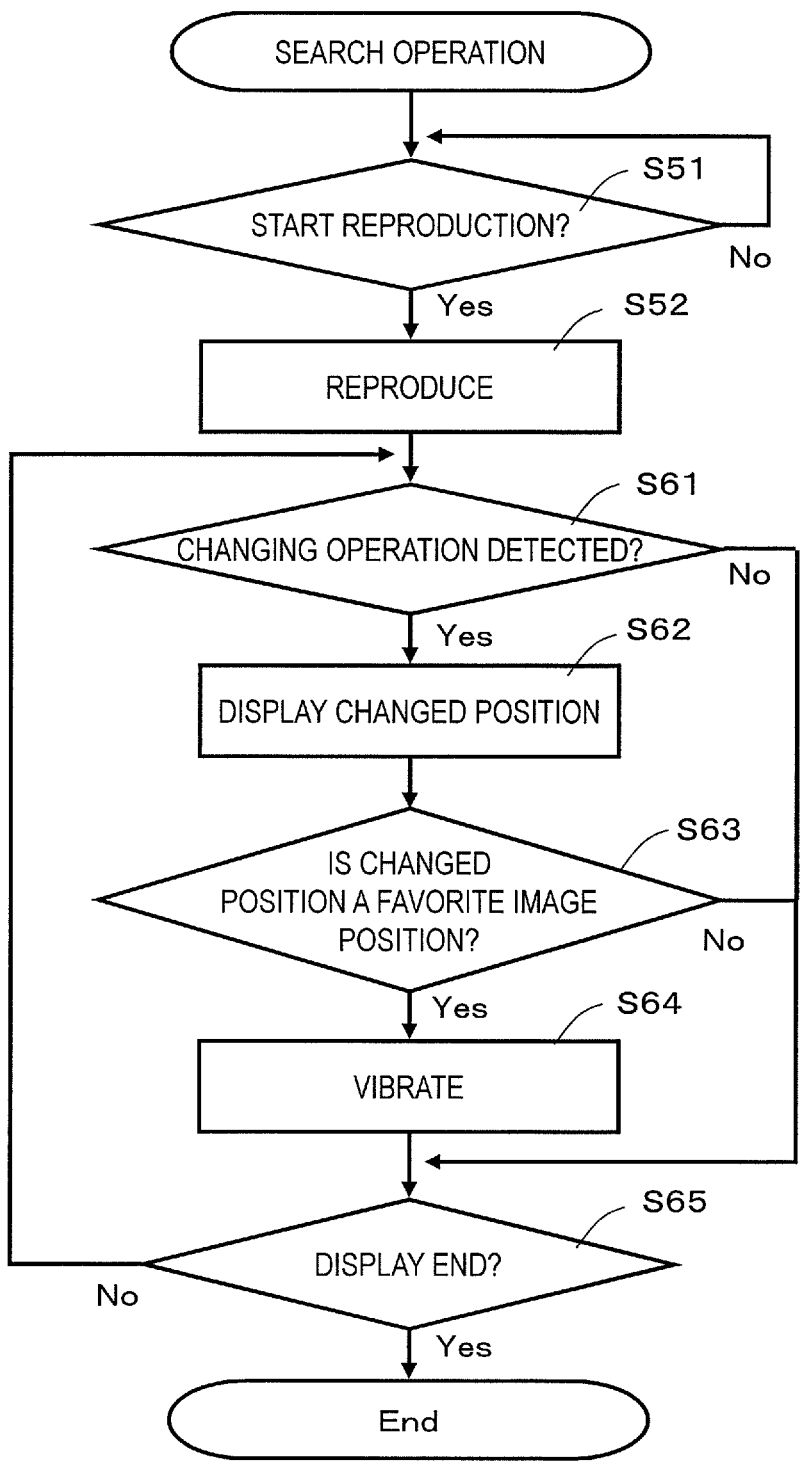
FIG. 17 is a flow chart illustrating an operation of searching for a registered favorite position according to an embodiment.

Next, an operation of searching for a display position of an already-registered favorite image will be described with reference to FIG. 17. FIG. 17 is a flow chart illustrating the favorite search operation.

The microcomputer 20 monitors whether the reproduction of still images is started (S51). When the reproduction of still images is started, the microcomputer 20 gives the reproduction section 14 an instruction to reproduce still images. In response to this, the reproduction section 14 reads out still image data from the RAM 39 and generates the reproduce data (S52). The reproduced still images are displayed in thumbnails in the still image display area 12.

When still images displayed in thumbnails, the microcomputer 20 monitors whether a scroll operation for changing the display position of still images is performed (S61). Specifically, the microcomputer 20 monitors whether the position of the slider 52 has been changed by the user.

When the display position of the slider 52 is changed by a user operation, the microcomputer 20 instructs the reproduction section 14 to reproduce still image data corresponding to the changed display position of the slider 52. The reproduction section 14 reads out from the RAM 39 still image data corresponding to the changed display position of the slider 52 to generate and output reproduce data to the display control section 32. The display control section 32 displays the reproduce data on the display section 12 (S62).

When the still image data corresponding to the changed display position of the slider 52 is displayed on the display section 12, the microcomputer 20 determines whether the still image corresponding to the changed position of the slider 52 has been registered as a favorite image (S63).

If it is determined that the still image corresponding to the changed position of the slider 52 has been registered as a favorite image, the microcomputer 20 instructs the vibration control section 33 to vibrate the vibrating section 13 (S64). By this vibration, the user can easily find the still image registered as a favorite.

As the user performs an operation to end the still image display, the reproduction ends (S65).

(Embodiment 6)

Next, the electronic device 10 according to Embodiment 6 will be described. In Embodiment 6, text data are displayed in a chronological order as content data.

[1. Configuration]

Figure 18:
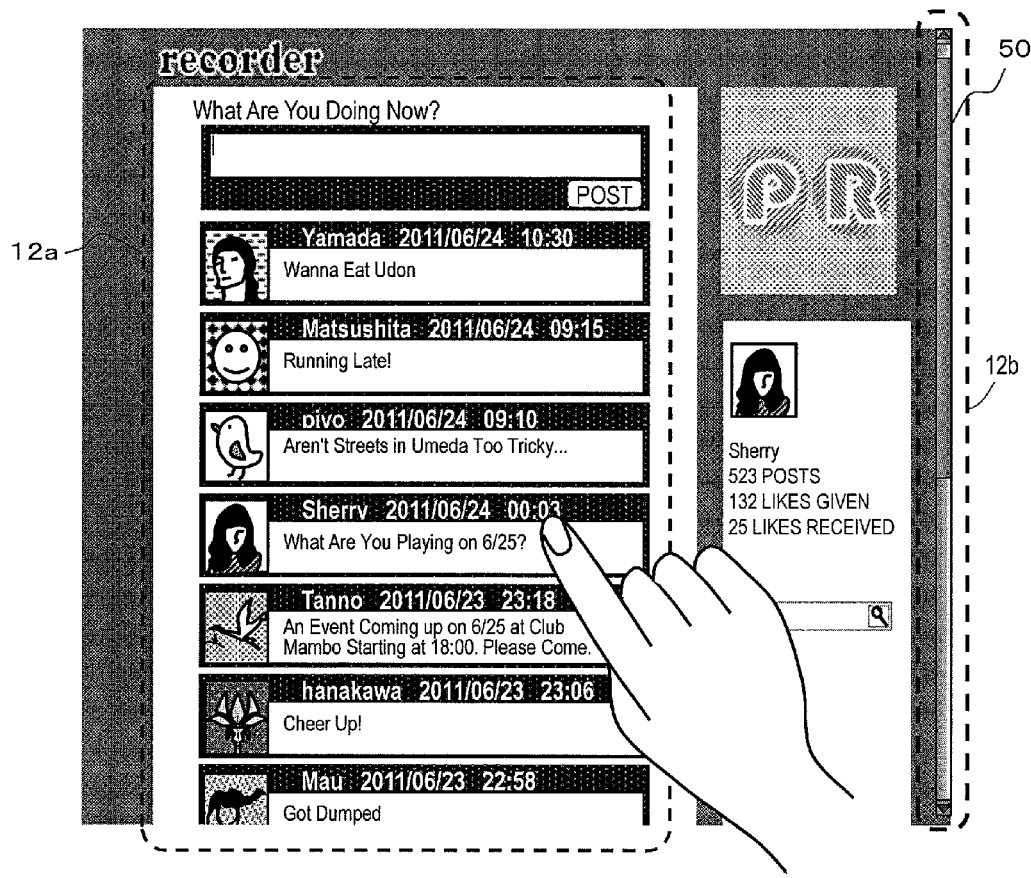
FIG. 18 is a diagram showing a display screen according to an embodiment.

Referring to FIG. 18, a configuration of the screen displayed on the display section 12 of the electronic device 10 when reproducing text data will be described.

As shown in FIG. 18, the display section 12 includes the display area 12*a* and the operation area 12*b*. Text data reproduced by the reproduction section 14 are displayed in the display area 12*a*.

For example, text data are current news, email, comments, and the like. Associated with the text data are some or all of the content of submission, the sender, the time of submission, the place of submission, the picture data, and the like.

The scroll bar 50 is displayed in the operation area 12*b*. The user can scroll the displayed text data by performing a touch operation on the scroll bar 50. The user can also scroll the text data by performing a touch operation so as to slide the display area 12*a*.

[2. Operation]

The text data are distributed from an external server. The distributed text data are displayed on the display area 12*a*.

The user can scroll the text data by performing a slide operation on the scroll bar 50 or the display area 12*a*.

The user can register the user's own favorite sender, favorite word, and the like, in advance. Then, as the user performs a scroll operation, the vibrating section 13 vibrates the touch panel 11 when a sender, a favorite word, or the like, that has been registered as a favorite is displayed in the display area 12*a*. By this vibration, the user can easily find a favorite sender or a favorite word.

As to the text data displayed in the display area 12*a*, comments from senders may be displayed in real time, or text data stored in an external server or the RAM 39 may be displayed.

<Other Embodiments>

Embodiments 1-6 have been described above as examples of the technique disclosed in the present application. However, the technique of the present disclosure is not limited thereto, and changes, replacements, additions, omissions, etc., may be added thereto as necessary. Different ones of the elements described in Embodiments 1-6 above may be combined together to obtain a new embodiment.

Other embodiments will be illustrated hereinbelow.

While a tablet-type information terminal device has been described in Embodiments 1-6 as an example of the electronic device, the electronic device is not limited thereto. For example, the electronic device may be any electronic device including a touch panel, such as a mobile telephone, a PDA, a game device, a car navigation, an ATM, etc.

While the touch panel 11 has been described in the embodiments above as an example of the operation section, the operation section is not limited thereto. For example, it may be a pointing device such as a mouse. In such a case, the vibrating section 13 is provided in the mouse, and the mouse is vibrated.

While the microcomputer 20 determines whether it is a favorite reproduction position in the embodiments above, the present invention is not limited to this. For example, the CPU of an external server may determine whether it is a favorite reproduction position, and transmit the determination result to an electronic device. While information regarding the favorite reproduction position is stored in the RAM 39, the present invention is not limited to this. For example, information regarding the favorite reproduction position may be stored in an external server.

There may be not only one but also a plurality of scenes where a vibration is generated. That is, the user may register a plurality of favorite scenes within one content item. The intensity of vibration or the vibration pattern may be varied between different favorite scenes. For example, the intensity of vibration may be varied depending on the number of comments. Note that a vibration may be generated at a point in time when a favorite image is displayed on the display section 12 or when a favorite image is displayed at the center of the display section 12.

While images are scrolled using the scroll bar in the embodiment above, the present invention is not limited to this. For example, an operation section such as a cross-shaped key may be displayed on the display section 12, and images may be scrolled as the user operates the cross-shaped key. With such a configuration, the user can easily find a favorite image by generating a vibration when the touch position of the user comes close to a favorite image.

While a tactile sensation is presented by generating a vibration in the embodiments above, the technique of the present disclosure is not limited thereto. Other than vibration, tactile sensations may be presented in other forms, e.g., as a variation of friction using static electricity, a skin stimulation using electric current, and a variation of screen shape using liquid. In addition to presenting a tactile sensation, screen display, sound, light, heat, etc., may be used in combination as necessary.

Note that the operation of the electronic device described above may be implemented by means of hardware or software. A computer program implementing such a control operation is stored, for example, in an internal memory of the microcomputer 20 or in the ROM 38. Such a computer program may be installed onto the electronic device from a storage medium (an optical disc, a semiconductor memory, etc.) storing the computer program, or may be downloaded via a telecommunications network such as the Internet.

Embodiments have been described above as an illustration of the technique of the present disclosure. The accompanying drawings and the detailed description are provided for this purpose. Thus, elements appearing in the accompanying drawings and the detailed description include not only those that are essential to solving the technical problems set forth herein, but also those that are not essential to solving the technical problems but are merely used to illustrate the technique disclosed herein. Therefore, those non-essential elements should not immediately be taken as being essential for the reason that they appear in the accompanying drawings and/or in the detailed description.

The embodiments above are for illustrating the technique disclosed herein, and various changes, replacements, additions, omissions, etc., can be made without departing from the scope defined by the claims and equivalents thereto.

The present disclosure is applicable to electronic devices which can be operated by a user, for example.

What is claimed is:

1. An electronic device comprising:
    a reproduction section for reproducing a content item;
    a panel member to be touched by a user for changing a reproduction position of the content item; and
    a vibrating section for vibrating the panel member,
    wherein the vibrating section varies the vibration of the panel member depending on whether or not the reproduction position which has been changed through a touch operation by the user on the panel member is a specified reproduction position, and
    wherein when the reproduction section changes the reproduction position of the content item by the touch operation by the user accepted by the panel member, the vibrating section vibrates the panel member if a reproduction position corresponding to a position on the panel member indicated by the touch operation by the user is a specified reproduction position.

2. The electronic device of claim 1, further comprising a display section for displaying a current reproduction position of the content item reproduced by the reproduction section.

3. The electronic device of claim 2, wherein the panel member is a member provided on a display surface side of the display section for accepting a touch operation by the user.

4. The electronic device of claim 1, wherein the specified reproduction position is set by the user.

5. The electronic device of claim 1, wherein the specified reproduction position is a position corresponding to a reproduction position that is registered as a favorite by the user in advance.

6. The electronic device of claim 1, wherein the specified reproduction position is set based on data in the content item.

7. The electronic device of claim 1, wherein the specified reproduction position is set based on the number of comments which have been written by viewers on the content item.

8. The electronic device of claim 7, wherein the specified reproduction position is a position corresponding to a period in which the number of comments per unit time is greater than or equal to a predetermined number.

9. The electronic device of claim 8, wherein where there are a plurality of periods in which the number of comments is greater than or equal to a predetermined number, the vibrating section vibrates the panel member more strongly in one of the plurality of periods in which the number of comments is larger than in another one of the plurality of periods in which the number of comments is smaller.

10. The electronic device of claim 1, wherein the specified reproduction position is set based on a volume of a sound included in the content item.

11. The electronic device of claim 10, wherein the specified reproduction position is a position corresponding to a reproduction position at which a sound volume is greater than or equal to a predetermined sound volume.

12. The electronic device of claim 11, wherein the vibrating section vibrates the panel member more strongly at a reproduction position at which the sound is louder than at a reproduction position at which the sound is less loud.

13. The electronic device of claim 1, wherein the content item includes at least one of a movie, a still image, a sound and text.

14. A non-transitory computer-readable recording medium storing a program for causing an electronic device to perform a vibration operation, the program causing the electronic device to perform the steps of:
    reproducing a content item;
    detecting an operation in which a user touches a panel member for changing a reproduction position of the content item; and
    varying a vibration based on whether or not a reproduction position which has been changed through a touch operation by the user on the panel member is a specified reproduction position,
    wherein when the reproduction position of the content item is changed by the touch operation by the user accepted by the panel member, vibrating the panel member if a reproduction position corresponding to a position on the panel member indicated by the touch operation by the user is a specified reproduction position.

* * * * *